UNITED STATES PATENT OFFICE.

SAMUEL S. EVELAND, OF BRYN MAWR, PENNSYLVANIA, ASSIGNOR TO EVELAND ELECTRIC RIVETER COMPANY, A CORPORATION OF NEW JERSEY.

PROCESS FOR CARBURIZING IRON OR STEEL.

1,133,626. Specification of Letters Patent. Patented Mar. 30, 1915.

No Drawing. Application filed April 12, 1910. Serial No. 554,935.

*To all whom it may concern:*

Be it known that I, SAMUEL S. EVELAND, of Bryn Mawr, in the county of Montgomery and State of Pennsylvania, have invented certain new and useful Improvements in Processes for Carburizing Iron or Steel, whereof the following is a specification.

My invention relates to those processes, ordinarily referred to as case-hardening or cementation processes, whereby carbon is caused to penetrate the surface of, and pass into iron or steel thereby increasing the carbon content of the metal; the extent of such penetration depending upon the conditions under which the process is conducted and the nature of agent employed. It is applicable not only to the ordinary case-hardening processes, as heretofore practised, but also to those cementation processes by which large masses or plates of metal are carburized.

My invention depends upon the discovery of a carburizing agent which I have found more efficient in yielding up its carbon to the metal, and causing it to penetrate therein, than any other substances which have heretofore been used for this purpose.

I have found that by using a vegetable substance containing a sufficient amount of carbon, and also containing a nitrogenous constituent, I am able to secure the superior results to which I have referred. As an example of a vegetable substance which fulfils these conditions, I will specify the pulpy matter which remains after the sugar has been extracted from beet. This refuse of the beet sugar industry is readily obtainable and consists of a fibrous mass which may be dried. It contains, in addition to carbohydrates, a considerable quantity (say over five per cent), of protein, which is a nitrogenous substance. In the practice of my process, I employ this material either with or without comminution, either simply dried or more or less charred, bringing it into proximity to the surface of the metal to be carburized and subjecting both to the required degree of heat as heretofore practised in this art. As a result, I find that a carburization which is more uniform and of greater depth is obtained in less time than by the use of other materials which have heretofore been employed for this purpose.

The exact nature of the chemical re-action that takes place is not fully understood by me, but I believe that the nitrogenous content in the vegetable matter which is employed is the agent which effects the more easy and uniform penetration of the carbon into the metal.

I claim:—

1. The process of carburizing iron or steel, which consists in heating it in the presence of fibrous vegetable waste depleted of starchy matter, but containing carbohydrates and a high percentage of protein.

2. The process of treating iron or low carbon steel for carburization, which consists in placing the iron or steel in proximity to the fibrous refuse from the manufacture of sugar, in a closed receptacle and heating the same.

In testimony whereof, I have hereunto signed my name at Philadelphia, Pennsylvania, this eleventh day of April, 1910.

SAMUEL S. EVELAND.

Witnesses:
JAMES H. BELL,
ELIZABETH A. REEVE.